J. W. WEST.
Hand Seeder.
No. 24,683.
Patented July 5, 1859.
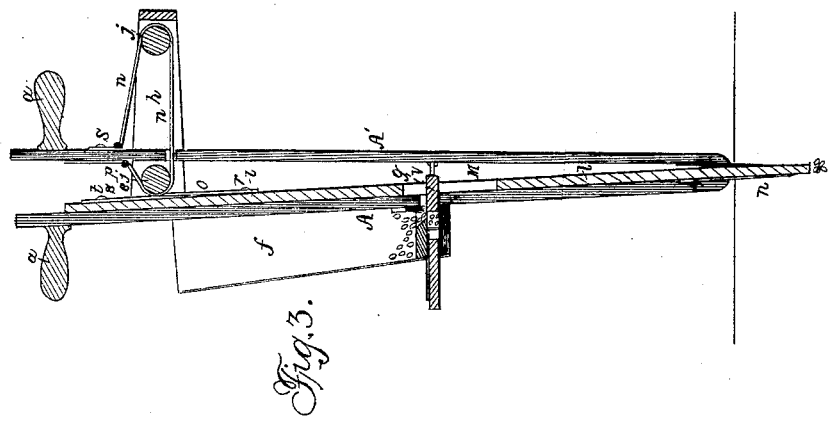
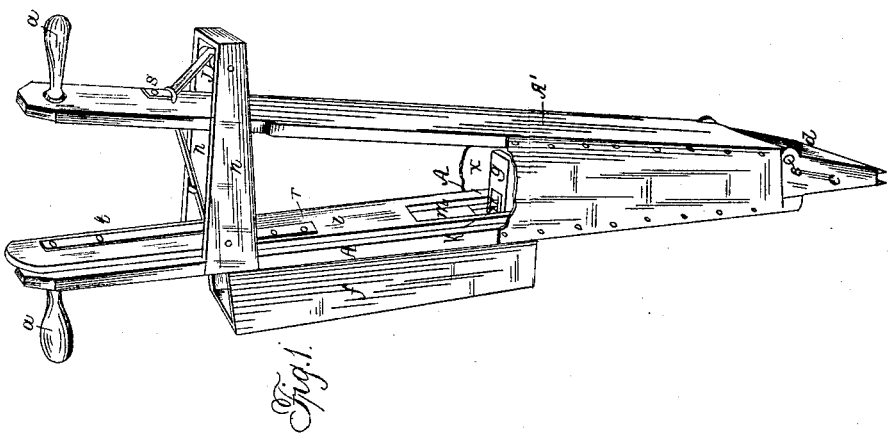
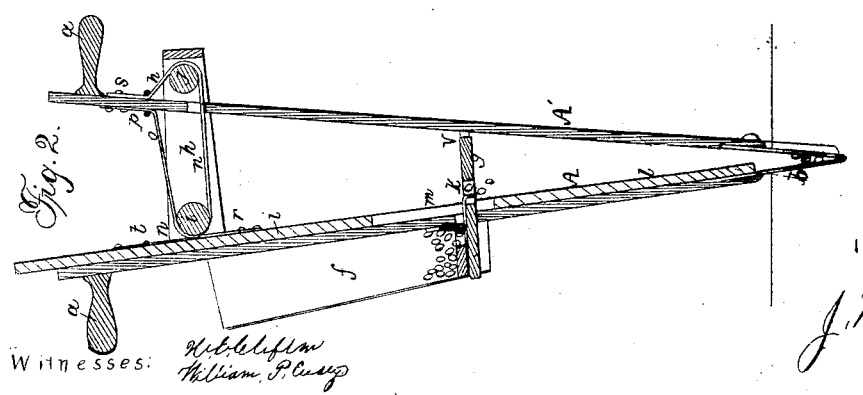
Witnesses:
Inventor:
J. W. West

UNITED STATES PATENT OFFICE.

J. W. WEST, OF HILLSBOROUGH, OHIO.

IMPROVEMENT IN CORN-PLANTERS.

Specification forming part of Letters Patent No. 24,683, dated July 5, 1859.

*To all whom it may concern:*

Be it known that I, J. W. WEST, of Hillsborough, in the county of Highland and State of Ohio, have invented a new and useful Improvement in Corn-Planters; and I do hereby declare that the following is a full, clear, and exact description thereof, reference being had to the accompanying drawings, and to the letters of reference marked thereon, and made to form a part of this specification.

The nature of my invention relates to the arrangement and operation of a plunger, by means of which corn may be forced from the planter into the earth and the certainty of seeding secured, as hereinafter specified and represented.

In reference to the accompanying drawings, Figure 1 is a perspective view of the planter with all its parts arranged for operation. Fig. 2 is a vertical sectional view of the planter, showing the plunger as being elevated to allow the seed to fall below it to the shovels, which are shown in position to be thrust into the ground. Fig. 3 is a vertical sectional view of the planter, showing its parts in the position at which the seed will be deposited in the ground.

A and A' represent the posts of the planter, provided with handles *a a*. The post A, at its lower end, is provided with a shovel, *b*, formed with flanges *c* at its sides, which flanges are pivoted to the post A' at *e*. The post A' is provided with a straight shovel, *d*, formed to fit within the flanges *c*, so that when the posts A A' are expanded, as shown in Fig. 2, the shovels *b d* are made to assume a wedge shape or form, and may be easily thrust into the earth.

*f* is a seed-hopper attached to the post A, in the lower part of which is a slot in which the feed-bar *g* is made to operate.

Attached to the upper portion of the post A are arms *h*, provided with rollers *i j*. The arms *h* are made to fit and serve as a guide for the post A' during the operation of planting.

*l* is a plunger formed with a slot, *m*, and arranged between the posts A A', as represented. This plunger *l* may be made to operate reciprocally by means of cords or straps *n o*. The strap *o* is attached to the post A' at *p*, passes over the roller *i*, and is attached to the plunger *l* at *r*, by means of which the plunger will be elevated as the posts A A' are expanded, as shown in Fig. 2, and the strap *n* is attached to the post A' at *s*, passes around the roller *j*, under the roller *i*, and is attached to the plunger *l* at *t*, by means of which the plunger will be depressed as the posts A A' are contracted, as shown in Fig. 3.

*x* is a sack attached to the lower part of the planter, and serves to guide the seed properly to the shovels *c d*. The feed-bar *g* is hinged to the post A' at *v*, so that as the posts A A' are expanded the seed contained in the aperture *k* will be allowed to fall to the shovels *c d*, and as the posts are contracted the bar *g* will be made to return for another supply.

The operation of the planter is as follows: The hopper *f* being filled with corn and the posts A A' being contracted, as shown in Fig. 3, the operator will take the machine by the handles *a* and expand the posts A A' to the position shown in Fig. 2, by means of which the shovels *b d* will be made to assume the wedge form. The feed-bar *g* will be withdrawn from the hopper, and the plunger being elevated, the corn is permitted to fall to the shovels *b d*, as shown in Fig. 2. In this position the shovels will be forced into the ground. The posts A A' will then be contracted, the shovels *b d* separated, and the plunger depressed and the seed forced into the earth, as shown in Fig. 3. The above operation being repeated, each hill of corn will be planted in the most perfect manner.

What I claim as my invention, and desire to secure by Letters Patent, is—

The arrangement of cords *o* and *n* with the pulleys *i* and *j*, working in arms *h h*, for operating the slotted plunger *l* and seeding-bar *g*, the whole operating together in the manner and for the purpose substantially as set forth.

In testimony of which invention I have hereunto set my hand.

J. W. WEST.

Witnesses:
 H. E. CLIFTON,
 W. P. EUSEY.